(12) United States Patent
Ranganathan et al.

(10) Patent No.: US 9,595,368 B2
(45) Date of Patent: Mar. 14, 2017

(54) SELF-CLEANING CABLE ASSEMBLIES (71) Applicant: GENERAL CABLE TECHNOLOGIES CORPORATION, Highland Heights, KY (US)

(72) Inventors: Kumar Ranganathan, Indianapolis, IN (US); Vijay Mhetar, Carmel, IN (US); Srinivas Siripurapu, Carmel, IN (US); Cody R. Davis, Maineville, OH (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/592,613

(22) Filed: Jan. 8, 2015

(65) Prior Publication Data
US 2015/0194237 A1  Jul. 9, 2015

Related U.S. Application Data (60) Provisional application No. 61/925,028, filed on Jan. 8, 2014.

(51) Int. Cl.
| | |
|---|---|
| *H02G 7/05* | (2006.01) |
| *H01B 5/00* | (2006.01) |
| *C09D 7/12* | (2006.01) |
| *H01B 7/285* | (2006.01) |
| *H01B 13/32* | (2006.01) |

(52) U.S. Cl.
CPC ............. *H01B 5/002* (2013.01); *C09D 7/12* (2013.01); *H01B 7/285* (2013.01); *H01B 13/327* (2013.01)

(58) Field of Classification Search
CPC ... H01B 1/14; H01B 3/10; H01B 3/34; H01B 3/36; H01B 3/38; H01B 3/47; H01B 3/48; H01B 8/05; H01B 5/14; H01B 7/17; H01B 7/18; H01B 7/22; H01B 7/226; H01B 7/2806; H01B 7/282; H01B 7/288; H01B 7/30; H01B 9/008; H01B 11/007; H01B 11/1041; H01B 11/058; H01B 13/0235; H01B 13/0285; H01B 13/0292; H02G 7/00; H02G 7/20
USPC ....... 174/69, 70 R, 70 A, 102 R, 108, 106 R, 174/106 SC, 113 R, 120 R, 120 C,
(Continued)

(56) References Cited

U.S. PATENT DOCUMENTS

| | | | | |
|---|---|---|---|---|
| 4,358,637 A | * | 11/1982 | Lanfranconi | ............ H01B 5/16 174/120 SC |
| 4,463,219 A | * | 7/1984 | Sato | ......................... H01B 5/02 174/127 |

(Continued)

FOREIGN PATENT DOCUMENTS

WO    2012035322 A2    3/2012

OTHER PUBLICATIONS

Thomas, Shane; International Search Report and Written Opinion of the International Searching Authority, issued in International Application No. PCT/US2015/010637; dated as mailed on Mar. 25, 2015; 9 pages.

*Primary Examiner* — William H Mayo, III
(74) *Attorney, Agent, or Firm* — Ulmer & Berne LLP (57) ABSTRACT

A cable assembly includes a conductor and a self-cleaning layer that surrounds the conductor and includes one or more of a photocatalyst and an electrocatalyst. Overhead high voltage electricity transmission lines are formed from these cable assemblies. Methods of reducing surface buildup on a cable are also provided.

17 Claims, 4 Drawing Sheets

(58) Field of Classification Search
USPC ........ 174/120 SC, 121 R, 126.1, 127, 128.1, 174/128.2
See application file for complete search history.

(56) References Cited

U.S. PATENT DOCUMENTS

| | | | |
|---|---|---|---|
| 5,616,532 A | 4/1997 | Heller et al. | |
| 6,013,372 A | 1/2000 | Hayakawa et al. | |
| 6,147,303 A * | 11/2000 | Abe ..................... | G02B 6/4419 174/117 R |
| 6,362,121 B1 | 3/2002 | Chopin et al. | |
| 6,475,628 B2 * | 11/2002 | Hase ...................... | C08L 23/10 174/110 R |
| 7,354,650 B2 * | 4/2008 | Nakajima ................. | C08J 7/045 428/323 |
| 7,449,245 B2 | 11/2008 | Akarsu et al. | |
| 7,745,535 B2 * | 6/2010 | Schmidt ............... | C08F 293/005 525/242 |
| 2005/0266248 A1 * | 12/2005 | Millero ................ | C09D 5/1675 428/411.1 |
| 2005/0266981 A1 * | 12/2005 | Nakajima ............ | C09D 5/1618 502/150 |
| 2007/0225436 A1 * | 9/2007 | Tamai .................... | C08L 83/04 524/860 |
| 2010/0032188 A1 * | 2/2010 | Meier ................... | H01B 17/50 174/140 C |
| 2010/0062966 A1 | 3/2010 | Lincoln et al. | |
| 2012/0172209 A1 * | 7/2012 | Lu ........................ | C03C 17/3417 502/214 |

* cited by examiner

SELF-CLEANING CABLE ASSEMBLIES

REFERENCE TO RELATED APPLICATION

The present application claims the priority of U.S. provisional application Ser. No. 61/925,028, entitled SELF-CLEANING OVERHEAD CONDUCTOR, filed Jan. 8, 2014, and hereby incorporates the same application herein by reference in its entirety.

TECHNICAL FIELD

The present disclosure generally relates to surface-modified cable assemblies with self-cleaning surface properties that allow the cable assemblies to remain debris-free over long periods of time.

BACKGROUND

As the need for electricity continues to grow, the need for higher capacity transmission and distribution lines grows as well. Overhead conductor lines, however, can become dirty from exposure to the environment and to weather elements. For example, the surfaces of aluminum alloy conductor materials can become dirty from airborne grime, dust particles, and the growth of mold, fungi, mosses, bacteria and other bio-forms. Such surface detriments can reduce emissivity, initiate corrosion, increase corona noises, and affect the aesthetics of the conductor. It would, therefore, be desirable to provide a conductor for overhead high voltage electricity transmission that is capable of self-cleaning so that the conductor surface remains clean and free of such detriments.

SUMMARY

According to one embodiment, a cable assembly includes a conductor and a self-cleaning layer surrounding the conductor. The self-cleaning layer includes one or more of a photocatalyst and an electrocatalyst. The one or more of the photocatalyst and electrocatalyst are in a crystalline state and have an average particle size of 1 nm to 100 nm. The cable assembly has a water contact angle smaller than a cable assembly without the self-cleaning layer when measured in accordance with ASTM D5725-99 (2008) after exposure to ultraviolet light for 60 minutes or more.

According to one embodiment, a method of reducing surface buildup on a cable assembly includes providing a conductor, pre-treating the conductor, applying a self-cleaning composition, and drying the self-cleaning composition to form a self-cleaning layer. The self-cleaning layer includes one or more of a photocatalyst and an electrocatalyst. The one or more of the photocatalyst and electrocatalyst are in a crystalline state and have an average particle size of 1 nm to 100 nm. The cable assembly has a water contact angle smaller than a cable assembly without the self-cleaning layer when measured in accordance with ASTM D5725-99 (2008) after exposure to ultraviolet light for 60 minutes or more.

According to one embodiment, a cable assembly includes a conductor and a self-cleaning layer surrounding the conductor. The self-cleaning layer includes a photocatalyst. The photocatalyst includes titanium oxide. The titanium oxide is in a crystalline state and has an average particle size of 10 nm to 50 nm. The cable assembly has a water contact angle smaller than a cable assembly without the self-cleaning layer when measured in accordance with ASTM D5725-99 (2008) after exposure to ultraviolet light for 60 minutes or more.

DETAILED DESCRIPTION

The present disclosure generally relates to cable assemblies formed from conductors with a self-cleaning layer. The self-cleaning layer can be formed from a self-cleaning composition that can include photocatalysts and/or electrocatalysts. According to certain embodiments, the photocatalysts and electrocatalysts can be on the nanoscale and be in the form of nanoparticles, nanowires, nanofibers or a mixture thereof. In certain embodiments, the photocatalyst or electrocatalyst particles can be in a crystalline state.

Certain photocatalysts can impart self-cleaning properties to surfaces upon exposure to ultraviolet ("UV") light through generation of sufficient oxidation potentials to oxidize organic debris. For example, certain photocatalysts such as titanium oxide ("$TiO_2$") can produce oxidation potentials of 3 eV or more upon exposure to UV light. Organic substances, such as mold and grime, can be oxidized and degraded by these potentials. Once degraded, the organic substances lose their adhesion to the photocatalytic surface and can be washed or blown away.

Similarly, certain photocatalysts and/or electrocatalysts can generate oxidation potentials through reactions with electric fields including, as can be appreciated, the electric fields generated by current flowing through conductors or conductive wires. Such self-cleaning reactions can occur synergistically with ultraviolet induced photocatalytic effects or can occur in the absence of light.

In certain embodiments, the photocatalyst or electrocatalyst can be a semi-conductive material, such as one or more of titanium oxide, zinc oxide, niobium oxide, cadmium sulfide, silver activated nanoparticles, tin oxide, potassium niobates, or lithium niobate. For example, in specific embodiments, the photocatalyst or electrocatalyst in an overhead conductor can be titanium oxide, zinc oxide, niobium oxide, or a mixture thereof. Further examples of suitable photocatalysts are disclosed in U.S. Patent App. Publication No. 2010/0062966 which is hereby incorporated by reference in its entirety.

In certain embodiments, the performance of a photocatalyst or electrocatalyst can be enhanced by using co-catalysts. Examples of such co-catalysts can include a variety of metals, semi-metals, non-metals, and compounds thereof. Specific examples of suitable metal compounds can include oxides, salts, and complexes including halides, nitrates, sulfides, sulfates, carboxylates (e.g., acetate), and acetylacetonate. Suitable metals can include platinum, palladium, rhodium, ruthenium, niobium, gold, molybdenum, osmium, tungsten, silver, copper, cobalt, iridium oxide, manganese, indium, tin, silver, and zinc. Examples of suitable semimetals and nonmetals that can act as a co-catalyst include carbon, nitrogen, phosphorus, sulfur, boron, arsenic, antimony, selenium, tellurium, chlorine, bromine, and iodine.

As can be appreciated, certain photocatalysts and electrocatalysts can be found in multiple states (e.g., crystalline states). For example, crystalline titanium oxide ($TiO_2$) can be found in anatase, rutile, and brookite forms. In certain embodiments, specific forms of a photocatalyst or an electrocatalyst can be selected. For example, in certain embodiments, crystalline $TiO_2$ can be used in the anatase form.

The average particle size of a photocatalyst or an electrocatalyst can vary. For example, suitable catalysts, such as $TiO_2$, can generally have an average particle size of 1 nm to 300 nm in certain embodiments, 5 nm to 100 nm in certain embodiments, and 10 nm to 50 nm in certain embodiments.

In certain embodiments, a self-cleaning layer containing a photocatalyst and/or an electrocatalyst can be free from a polymeric binder. In certain embodiments, the dry weight % of the photocatalyst and/or electrocatalyst can be 50% or more of the self-cleaning layer; and in certain embodiments can be 90% or more. The concentration of a photocatalyst or electrocatalyst in the self-cleaning layer, however, can also be 10% or less in certain embodiments, 5% or less in certain embodiments, and 2% or less in certain embodiments.

The thickness of a self-cleaning layer including photocatalysts and/or electrocatalysts can vary. For example, the self-cleaning layer can have a thickness of 20 microns or less in certain embodiments, 5 microns or less in certain embodiments, or a thickness of 1 micron or less in certain embodiments. As can be appreciated, very thin layers can be useful to reduce the cost of materials among other benefits.

In certain embodiments, a self-cleaning layer can be coated directly onto a bare overhead conductor, or can be coated over other intermediate layers present in a cable assembly. As can be appreciated, a conductor can be formed from a single conductive wire or can be formed from a plurality of conductive wires. When a conductor is formed from a plurality of wires, a single self-cleaning layer can be applied around the stranded conductor or a plurality of self-cleaning layers can be applied around each, or only certain, of the conductive wires. For example, in certain embodiments, only the outermost conductive wires can be individually coated with a self-cleaning layer.

Generally, the photocatalyst or electrocatalyst can be included in a self-cleaning composition that can be dried to form a self-cleaning layer. In certain embodiments, the pH of the self-cleaning composition can be between 3 and 12, and in certain embodiments can be between 6 and 10.

The specific formulation of a self-cleaning composition is not particularly limited. For example, any photocatalyst-based or electrocatalyst-based composition that meets the particle size requirements can be used, including, for example, peroxo titanium acid solutions, peroxo-modified anatase solutions, nano titanium oxide solutions, and nano titanium oxide slurries. Examples of commercially available coating solutions that meet such requirements include, but are not limited to, Kon Corporation products (PTA-85, PTA-170, TPX-85, TPX-220, TO-85, and TO-240), Solar Stucco from Green Earth Nano Science Inc., Joma-International products (Titan-DEGME 20, Titan-DEGME 45, Titan-PMA 20, Titan-PDMS and others), Advanced Nano Technology/TIPE products (C, X, PT, G, O, E, AG, F, H, PG, and AG series of coatings), and Gens Nano™ Photocatalyst coatings from MCH Nano Solution, and Hydrotech from TOTO.

Components of Conductive Wire and Conductor Cable

A self-cleaning layer can be applied around a variety of cables including high voltage overhead electricity transmission lines. As can be appreciated, such overhead electricity transmission line conductors can be formed in a variety of configurations and can generally include a core formed from a plurality of conductive wires. For example, aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from high-purity aluminum alloys having a high conductivity and low weight. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of aluminum, or aluminum alloy, wires. ACCC cables, in contrast, are reinforced by a central core formed from one, or more, of carbon, glass fiber, or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables are made with aluminum or aluminum alloy wires. AAAC cables can have a better corrosion resistance, due to the fact that they are largely, or completely, aluminum. ACSR, ACSS, ACCC, and AAAC cables can be used as overhead cables for overhead distribution and transmission lines.

As can be appreciated, a cable can also be a gap conductor. A gap conductor can be a cable formed of trapezoidal shaped temperature resistant aluminum zirconium wires surrounding a high strength steel core.

FIGS. 1, 2, 3, and 4 illustrate various bare overhead conductors according to certain embodiments. Each overhead conductor depicted in FIGS. 1-4 can include a self-cleaning layer through, for example, a flooded die application process. Additionally, FIGS. 1 and 3 can, in certain embodiments, be formed as ACSR cables through selection of steel for the core and aluminum for the conductive wires. Likewise, FIGS. 2 and 4 can, in certain embodiments, be formed as AAAC cables through appropriate selection of aluminum or aluminum alloy for the conductive wires.

Figure 1:
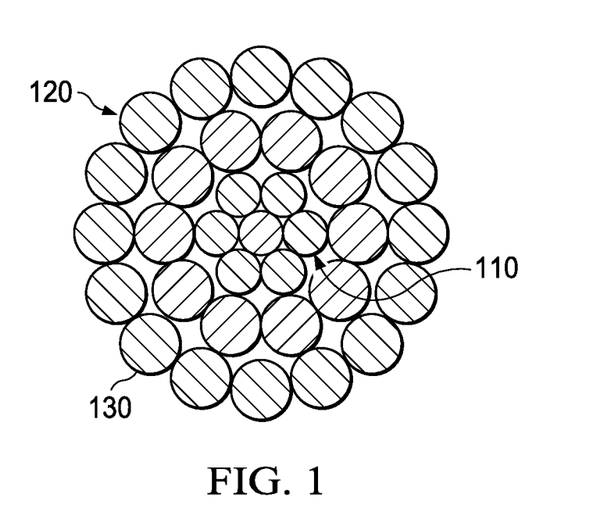
FIG. 1 depicts a cross-sectional view of a bare conductor having a plurality of core wires according to one embodiment.

As depicted in FIG. 1, certain bare overhead conductors 100 can generally include a core 110 made of one or more wires, a plurality of round cross-sectional conductive wires 120 locating around core 110, and a self-cleaning layer 130. The core 110 can be steel, invar steel, carbon fiber composite, or any other material that can provide strength to the conductor. The conductive wires 120 can be made of any suitable conductive material including copper, a copper alloy, aluminum, an aluminum alloy, including aluminum types 1350, 6000 series alloy aluminum, aluminum-zirconium alloy, or any other conductive metal.

Figure 2:
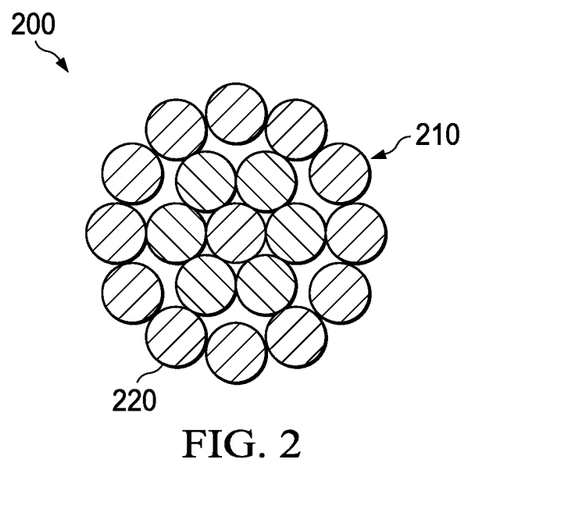
FIG. 2 depicts a cross-sectional view of a bare conductor without core wires according to one embodiment.

As depicted in FIG. 2, certain bare overhead conductors 200 can generally include round conductive wires 210 and a self-cleaning layer 220. The conductive wires 210 can be made from copper, a copper alloy, aluminum, an aluminum alloy, including aluminum types 1350, 6000 series alloy aluminum, an aluminum-zirconium alloy, or any other conductive metal.

Figure 3:
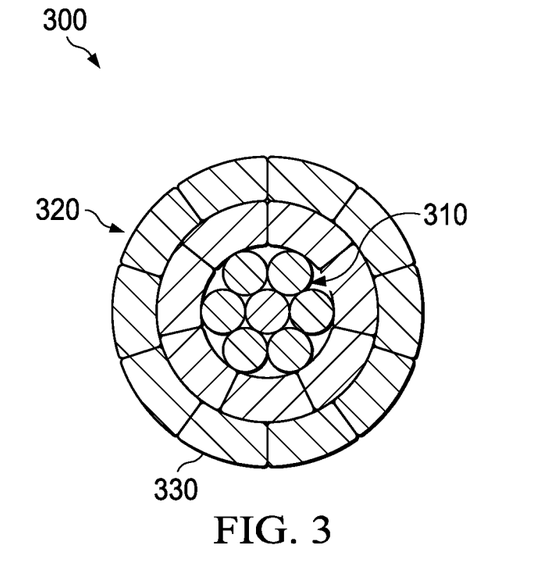
FIG. 3 depicts a cross-sectional view of a bare conductor formed of trapezoidal shaped conductive wires and having a plurality of core wires according to one embodiment.

As seen in FIG. 3, certain bare overhead conductors 300 can generally include a core 310 of one or more wires, a plurality of trapezoidal-shaped conductive wires 320 around a core 310, and a self-cleaning layer 330. The core 310 can be steel, invar steel, carbon fiber composite, or any other material providing strength to the conductor. The conductive wires 320 can be copper, a copper alloy, aluminum, an aluminum alloy, including aluminum types 1350, 6000 series alloy aluminum, an aluminum-zirconium alloy, or any other conductive metal.

Figure 4:
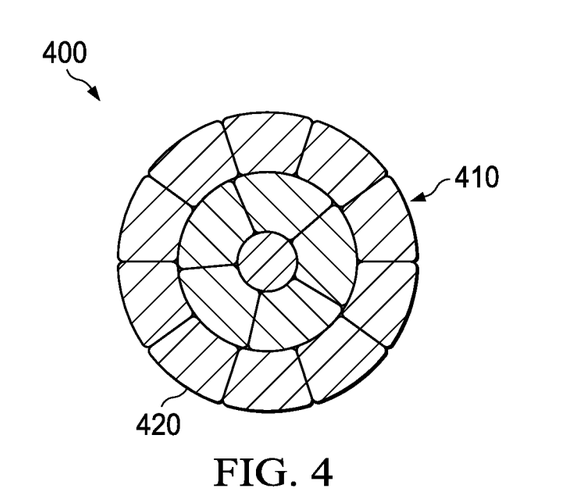
FIG. 4 depicts a cross-sectional view of a bare conductor formed from trapezoidal shaped conductive wires and without core wires according to one embodiment.

As depicted in FIG. 4, certain bare overhead conductors 400 can generally include trapezoidal-shaped conductive wires 410 and a self-cleaning layer 420. The conductive wires 410 can be formed from copper, a copper alloy, aluminum, an aluminum alloy, including aluminum types 1350, 6000 series alloy aluminum, an aluminum-zirconium alloy, or any other conductive metal.

A self-cleaning layer can also, or alternatively, be utilized in composite core conductor designs. Composite core conductors are useful due to their lower sag at higher operating temperatures and their higher strength to weight ratio. Non-limiting examples of composite cores can be found in U.S. Pat. No. 7,015,395, U.S. Pat. No. 7,438,971, U.S. Pat. No. 7,752,754, U.S. Patent App. No. 2012/0186851, U.S. Pat. No. 8,371,028, U.S. Pat. No. 7,683,262, and U.S. Patent App. No. 2012/0261158, each of which are incorporated herein by reference.

As can be appreciated, the conductive wires can also be formed in other geometric shapes and configurations. In certain embodiments, the plurality of conductor wires can also, or alternatively, be filled with space fillers or gap fillers.

Intermediate Layers

In certain embodiments, a self-cleaning composition can be applied directly over either a bare conductor or over an intermediate layer that surrounds the bare conductor. In certain embodiments including such an intermediate layer, the intermediate layer can have a thickness of 10 μm to 50 μm, or can have a thickness of 20 μm to 40 μm. An intermediate layer can be formed of any suitable organic or inorganic materials. Examples of suitable inorganic materials and intermediate layers are further disclosed in U.S. Provisional App. No. 62/010,144 and U.S. Patent App. Publication No. 2014/0041925 each of which is hereby incorporated by reference in their entirety. As can be appreciated, intermediate layers can provide a variety of benefits to a cable and can be, for example, a high emissivity coating layer, a temperature reduction coating layer, a corona resistance coating layer, a corrosion resistance coating layer, an ice build-up resistance coating layer, a silicate coating layer, or an electrochemical coating layer.

Intermediate layers can be formed from a variety of suitable materials. For example, an intermediate layer can be formed from one or more of silicate based materials, methyl silicone, polyvinylidene fluoride (PVDF), cross-linked fluoro polymers, acrylics and metal oxide coatings including aluminum oxide and titanium dioxide.

In certain embodiments, an intermediate layer can also include a photocatalyst and/or an electrocatalyst. In certain such embodiments, the intermediate layer can include 10% or more, by weight, of the photocatalyst and/or electrocatalyst and, in certain embodiments, 10% to 35%, by weight, of the photocatalyst and/or electrocatalyst. In certain embodiments, the photocatalyst or electrocatalyst can be crystalline titanium oxide including, for example, anatase and/or rutile state $TiO_2$. In certain embodiments, an intermediate layer including a photocatalyst and/or an electrocatalyst can produce a self-cleaning effect.

As can be appreciated, intermediate layers can be applied through any suitable method, including, for example, aqueous based methods, solvent based methods, coating slurry methods, sol-gel methods, thermal spray methods, vapor deposition methods, and electro-chemical coating methods. Such application processes can be batch processes or continuous processes and can include dip processes, spray processes, electro-chemical processes, thermal spray processes, plasma spray processes, chemical vapor deposition processes, or plasma vapor deposition processes.

Coating Process

As can be appreciated, a self-cleaning layer can be applied to a cable in a variety of ways. For example, in certain embodiments including a stranded conductor, a self-cleaning layer can be applied to the individual conductive wires before they are assembled into a conductor, or a self-cleaning layer can be applied to an assembled conductor. In certain embodiments applying the self-cleaning layer to the individual conductive wires, it can be beneficial to coat only the wires that will become the outermost strands in the conductor. Such a coating technique can be more economical in both cost and weight. In embodiments coating the assembled conductor, the coating can be applied to the entirety of the outside surface or can be applied only to certain parts of the outer surface of the bare conductor.

In certain coating processes, a coating surface of the conductive wires or the bare conductor can be prepared with a surface pre-treatment process before application of the self-cleaning composition.

Beneficially, the self-cleaning layer formed from the self-cleaning composition can also be applied to overhead conductor cables which are already installed or are in use. Existing conductors can be coated in a similar fashion to unused bare conductors using an automated, or semi-automated, robotic system.

Generally, each coating process can include the steps of: 1) cleaning the conductor surface; 2) applying a self-cleaning layer to the conductor surface; and 3) drying/curing the self-cleaning layer. The coating process can be a batch process, a semi-batch process, or a continuous process.

1. Surface Pre-Treatment

In certain coating processes, a pre-treatment process can be used to prepare the conductor surface for coating. Pre-treatment processes can include, but are not limited to, chemical treatment, pressurized air cleaning, hot water or steam cleaning, brush cleaning, heat treatment, sand blasting, ultrasound, deglaring, solvent wipe, plasma treatment, and the like. For example, in certain embodiments, the surface of an overhead conductor can be deglared by a sand blasting process.

Surface preparation processes can also be used in the preparation of related products including, for example, the preparation of conductor accessories, parts and products related to overhead conductor electrical transmission and distribution, and parts for temperature reduction purposes. Specific examples can include, but are not limited to, dead ends/termination products, splices/joints products, suspension and support products, motion control/vibration products (also called dampers), guying products, wildlife protection and deterrent products, conductor and compression fitting repair parts, substation products, clamps and other transmission and distribution accessories. These products are commercially available from many manufacturers, such as Preformed Line Products (PLP), Cleveland, Ohio, and AFL, Duncan, S.C.

Figure 5:
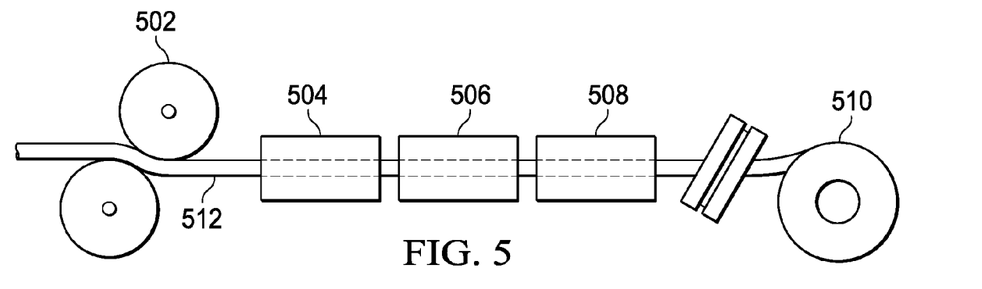
FIG. 5 depicts a continuous coating process for a conductor according to one embodiment.

An illustrative embodiment of a pretreatment process is depicted in FIG. 5. The process of FIG. 5 starts with a conductor initially stored in an intake winding roll 502. Upon the start of the process, the conductor 512 can be unrolled and undergo a surface pretreatment process in pretreatment unit 504.

In the pretreatment unit 504, the surface of the conductor 512 can be prepared by media blasting using media such as sand, glass beads, ilmenite, or steel shot. Following media blasting, air-wiping can be used to blow particulate materials off the conductor 512. Generally, such an air-wipe can consist of nozzles that blow jets of air onto the conductor 512 at an angle and in a direction opposing the direction of travel of the conductor 512. In certain embodiments, the air jets can create a 360° ring of air that attaches to the circumference of the conductor 512 and wipes the surface with the high velocity of air. In such embodiments, as the conductor exits the pretreatment unit 504, any particles on the conductor 512 can be wiped off and blown back into the pretreatment unit 504. Such air jet can operate at about 60 PSI to about 100 PSI in certain embodiments, about 70 PSI to about 90 PSI in certain embodiments, and at about 80 PSI in certain embodiments. The air jet can have a velocity (coming out of the nozzles) of about 125 mph to about 500 mph in certain embodiments, a velocity of about 150 mph to about 400 mph in certain embodiments, and a velocity of about 250 mph to about 350 mph in certain embodiments. After the air wipe, the number of particles greater than 10 microns in size remaining on the surface of a conductor can be lower than 1,000 per square feet in certain embodiments, or less than 100 per square feet in certain embodiments.

Following the air wipe, the conductor can pre-heated prior to coating with the self-cleaning composition. Any suitable heating source can be used including, for example, the use of a heating oven, UV, IR, E-beam, open flames, or the like. Such heating can be accomplished in a single heating unit or multiple heating units. For example, in certain embodiments, the heating can occur through application of a single direct flame to the cable to heat the cable surface to a temperature above ambient temperature. A high pretreatment temperature can allow for a lower heating temperature after application of the self-cleaning composition. However, the heating should be controlled to ensure good adherence, evenness, and blistering with the self-cleaning composition. For example, preheating can be limited to about 140° C. or less in certain embodiments, or to 120° C. or less in certain embodiments. Following pre-treatment in pretreatment unit 504, the conductor 512 can be sequentially advanced through a coating unit 506 and a drying/curing unit 508 before being re-wound on a take-up reel 510.

2. Coating

Figure 6:
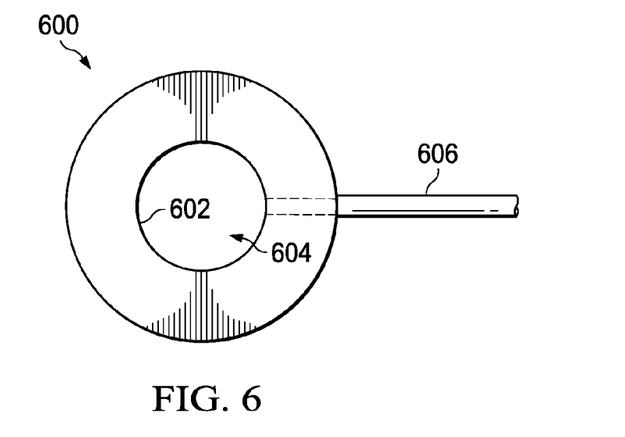
FIG. 6 depicts a cross-sectional view of a flooded die according to one embodiment.
Figure 7:
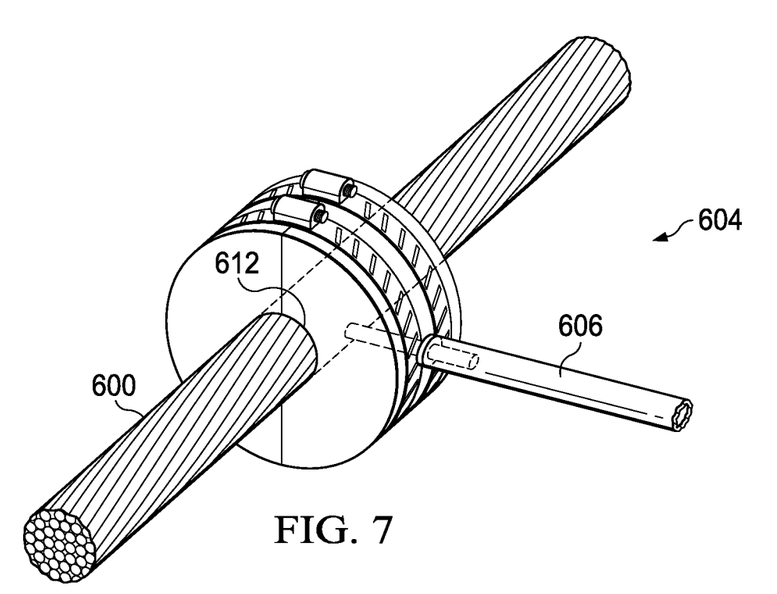
FIG. 7 depicts a perspective view of a flooded die according to one embodiment.

Following pre-treatment of a conductor, the conductor can be coated with the self-cleaning composition. The coating process can take place in a coating unit. In such coating units, a conductor can pass through a flooded die that deposits a liquid suspension of the self-cleaning composition onto the prepared surface of the conductor. FIGS. 6 and 7 depict an annular shaped flooded die 600. Generally, the self-cleaning composition can be fed to the die 600 via a tube 606. As the conductor 612 passes through the center opening 604 of the flooded die 600, the self-cleaning composition can coat the conductor 612 via opening ports 602 in the inner surface of the die 600. The flooded die 600 contains two or more opening ports 602 in certain embodiments, four or more opening ports 602 in certain embodiments, or six or more opening ports 602 in certain embodiments. The opening ports 602 can be evenly spaced around a circumference of the inner surface 602. Once the conductor 612 exits the flooded die, it can then pass through an air wipe to remove excess composition and to spread the self-cleaning composition evenly around the conductor. As can be appreciated, in the case of a stranded conductor, the air wipe can also allow the self-cleaning composition to penetrate the grooves between the strands on the surface of the conductor 612. The air wipe can operate similarly to the air wipe in the pretreatment unit 504.

3. Drying/Curing

Once a conductor is coated with the self-cleaning composition, the coated conductor can be dried and/or cured in, for example, a drying/curing unit. Such a drying/curing unit can dry and cure the self-cleaning layer through the use of either cool air or through the use of heated air. For example, in certain embodiments, air can be heated to 1000° C. or less and blown on the coated conductor. The line speed of the coated conductor in the drying/curing unit can vary depending on the components in the self-cleaning layer and the metal alloy of the conductor. In certain embodiments, the line speed can be between about 9 feet/min to about 500 feet/min, and in certain embodiments, the line speed can be about 10 feet/min to about 400 feet/min. Alternatively, the drying process can also be a gradual drying process, a rapid drying process, or a direct flame drying process. Further, and as can be appreciated, a drying or curing process also can be accomplished through other techniques, including, for example, the use of a heating oven, and UV, IR, E-beam, chemical, or liquid spray processes.

Further variations to the drying processes are also contemplated. For example, the drying processes can be accomplished by a single unit or can be accomplished using multiple units. Additionally, the drying process can occur at any suitable angle and can be, for example, vertical or horizontal. As an illustration of a suitable drying process, a cable can be dried and cured through direct application of flame. The cable can pass directly through a flame to heat the cable surface to a temperature of up to about 150° C. in certain embodiments or 120° C. in other certain embodiments. Once dried and/or cured, the coated conductor can be wound on a roller for storage.

Alternative Coating Methods

As can be appreciated, other coating processes can also be used. For example, the self-cleaning composition can alternatively be applied by a spray gun, having, for example, 10 to 45 psi pressure. The spray gun nozzle in such embodiments can be perpendicular to the direction of the conductor (i.e., at a 90° angle) in order to ensure a uniform coating on the conductor. In specific cases, two or more guns can also be used to provide a more efficient coating. The coating thickness and density in such embodiments can be controlled by the admixture viscosity, gun pressure, and the conductor line speed. Further, in certain embodiments, the conductor can be pre-heating to a temperature maintained between 10° C. to 90° C.

Alternatively, the self-cleaning composition can be applied to a conductor by dipping or through use of a brush or a roller. In such embodiments, a cleaned and dried conductor can be dipped into the coating mixture to allow the mixture to completely coat the conductor. The conductor can then be removed from the coating mixture and allowed to dry. For example, after a dip application process, the coating on the conductor can be allowed to dry by evaporation either at room temperature or accelerated by using elevated temperatures of 250° C. or more.

In certain such processes, a continuous process can be utilized. For example, in certain such embodiments coating individual wire strand, a continuous process can operate at a line speed of about 2500 ft/min or less, about 9 ft/min to about 2000 ft/min in certain embodiments, about 10 ft/min to about 500 ft/min in certain embodiments, and about 30 ft/min to about 300 ft/min in certain embodiments.

Examples

1. Color Values

The following examples illustrate the self-cleaning effects of a photocatalytic $TiO_2$ coating on aluminum. In Table 1, red organic fountain pen ink was applied to 50 mm×50 mm×2 mm aluminum substrate samples coated with a 1 micron thick $TiO_2$ self-cleaning layer. The $TiO_2$ particles had an average particle size of about 10 nm and were commercially obtained as TPX 220 from Kon Corporation. The self-cleaning layer was applied through a dip coating process and was heat dried at temperatures ranging from about 80° C. to 300° C. The ink was diluted with water using a 20-fold reduction and then applied to the surface of the aluminum sample. Each sample was then exposed to sunlight for 60 minutes. The 'a' color scale of each sample was then measured using a Spectro-guide 45/0 gloss by BYK-Gardner USA in accordance with ASTM D2244-11 (2011). The color values for each sample are reported in Table 1. As indicated by the 'a' value, the red color faded dramatically after UV exposure. A 400 watt metal halide was used as a UV source.

TABLE 1

| Sample Name | a value |
| --- | --- |
| Aluminum substrate with $TiO_2$ coating | 3.57 |
| Aluminum substrate with $TiO_2$ coating + red ink applied; no UV Exposure | 35.49 |
| Aluminum substrate with $TiO_2$ coating + red ink applied; UV Exposure for 60 min | 0.21 |

2. Water Contact Angle

Table 2 depicts water contact angle results for several substrates and demonstrates that a self-cleaning layer can reduce water contact angles. Sample 1 is an uncoated (bare) aluminum substrate. Sample 2 is an aluminum substrate coated with a self-cleaning layer formed from $TiO_2$. The $TiO_2$ is TPX 220 from Kon Corporation and is coated at a thickness of 1 micron. Sample 3 is an aluminum sample coated with a commercially available aluminum intermediate layer formed from a non-photocatalytic material. Sample 4 is an aluminum sample including the commercially available aluminum intermediate layer and after further including a 1 micron thick $TiO_2$ (TPX 220 from Kon Corporation) layer over the intermediate layer.

Contact angles for each sample were measured before and after 60 minutes of UV exposure in accordance with ASTM D5725-99 (2008). In the test, water droplets were placed on the surface and then photographed on the surface by a camera both before and after UV exposure. The contact angle of the water droplet is the angle at which a liquid/vapor interface meets the solid surface. The contact angle is specific for any given system and is determined by the interactions across the surface. Table 2 shows the contact angle values of each sample.

TABLE 2

| Samples | Description | Water contact angle (°) |
| --- | --- | --- |
| Sample 1 | Uncoated Aluminum substrate | 72.3 |
| | Uncoated Aluminum substrate, UV Exposure 60 min | 76.4 |
| | Contact angle change | −4.1 (−5.7%) |
| Sample 2 | $TiO_2$ Coated Aluminum substrate | 77.0 |
| | $TiO_2$ Coated Aluminum substrate, UV Exposure 60 min | 68.6 |
| | Contact angle change | 8.4 (10.9%) |
| Sample 3 | Inorganic Intermediate Layer Coated Aluminum substrate | 74.5 |
| | Inorganic Intermediate Layer Coated Aluminum substrate, UV Exposure 60 min | 76.9 |
| | Contact angle change | −2.4 (−3.2%) |
| Sample 4 | Inorganic Intermediate Layer + $TiO_2$ Coated Aluminum substrate | 87.0 |
| | Inorganic Intermediate Layer + $TiO_2$ Coated Aluminum substrate, UV Exposure 60 min | 71.2 |
| | Contact angle change | 15.8 (18.2%) |

As depicted in Table 2, the samples including the $TiO_2$ self-clean layer demonstrated a reduction in water contact angles of about 7% or more after UV exposure. Conversely, the samples without the self-cleaning layer showed no reduction. The reduction of contact angle shows that $TiO_2$ coating makes the sample surface hydrophilic which in turn produces a self-cleaning effect. As can be appreciated, this hydrophilic effect can further reduce corona noise.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable assembly, comprising:
   a conductor;
   a self-cleaning layer surrounding the conductor, the self-cleaning layer comprising one or more of a photocatalyst and an electrocatalyst; and
   an intermediate layer surrounding the conductor and disposed between the conductor and the self-cleaning layer, the intermediate layer formed from an inorganic, non-photocatalytic material; and
   wherein the one or more of the photocatalyst and electrocatalyst are in a crystalline state and have an average particle size of 1 nm to 100 nm, and the cable assembly comprises a water contact angle smaller than a cable assembly without the self-cleaning layer when measured in accordance with ASTM D5725-99 (2008) after exposure to ultraviolet light for 60 minutes or more.

2. The cable assembly of claim 1, wherein the one or more of the photocatalyst or the electrocatalyst comprises a semiconductive material or conductive material.

3. The cable assembly of claim 1, wherein the one or more of the photocatalyst and the electrocatalyst comprises titanium oxide.

4. The cable assembly of claim 3, wherein the titanium oxide is in an anatase crystalline state.

5. The cable assembly of claim 1, wherein the self-cleaning layer further comprises a co-catalyst.

6. The cable assembly of claim 1, wherein the self-cleaning layer has a thickness of 5 microns or less.

7. The cable assembly of claim 1, wherein the one or more of the photocatalyst and the electrocatalyst comprises more than 90%, by dry weight, of the self-cleaning layer.

8. The cable assembly of claim 1, wherein the self-cleaning layer is free of polymer.

9. The cable assembly of claim 1, wherein the water contact angle for the cable assembly is reduced by 7% or more after exposure to the ultraviolet light.

10. The cable assembly of claim 1, wherein the intermediate layer has a thickness of about 20 μm to about 40 μm.

11. The cable assembly of claim 1, wherein the self-cleaning layer conforms to the intermediate layer.

12. The cable assembly of claim 1, wherein the self-cleaning layer is the outermost layer of the cable assembly.

13. An overhead high voltage electricity transmission line formed from the cable assembly of claim 1.

14. The overhead high voltage electricity transmission line of claim 13, wherein the conductor comprises:
   a core, the core comprising one or more of carbon fiber composite, glass fiber composite, aluminum, and aluminum alloy fibers reinforced in aluminum; and
   one or more electrically conductive wires, the one or more electrically conductive wires surrounding the core.

15. The cable assembly of claim 1, wherein the conductor comprises a plurality of conductive wires.

16. A cable assembly, comprising:
   a conductor;
   a self-cleaning layer surrounding the conductor, the self-cleaning layer comprising a first photocatalyst comprising titanium oxide; and
   an intermediate layer surrounding the conductor and disposed between the conductor and the self-cleaning layer, the intermediate layer comprising from 10% to 35%, by weight, of one or more of a second photocatalyst and an electrocatalyst;
   wherein the titanium oxide is in a crystalline state and has an average particle size of 10 nm to 50 nm, and the cable assembly comprises a water contact angle smaller than a cable assembly without the self-cleaning layer when measured in accordance with ASTM D5725-99 (2008) after exposure to ultraviolet light for 60 minutes or more.

17. A cable assembly, comprising:
   a conductor; and
   a self-cleaning layer surrounding the conductor as the outermost layer of the cable assembly, the self-cleaning layer comprising one or more of a photocatalyst and an electrocatalyst and being free of polymer; and
   wherein the one or more of the photocatalyst and electrocatalyst are in a crystalline state and have an average particle size of 1 nm to 100 nm, and the cable assembly comprises a water contact angle smaller than a cable assembly without the self-cleaning layer when measured in accordance with ASTM D5725-99 (2008) after exposure to ultraviolet light for 60 minutes or more.

* * * * *

UNITED STATES PATENT AND TRADEMARK OFFICE
CERTIFICATE OF CORRECTION

| | | |
|---|---|---|
| PATENT NO. | : 9,595,368 B2 | Page 1 of 1 |
| APPLICATION NO. | : 14/592613 | |
| DATED | : March 14, 2017 | |
| INVENTOR(S) | : Sathish Kumar Ranganathan et al. | |

It is certified that error appears in the above-identified patent and that said Letters Patent is hereby corrected as shown below:

On the Title Page

Item (72), "Inventors" section, change "Kumar Ranganathan" to --Sathish Kumar Ranganathan--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*